United States Patent
Edmiston et al.

(10) Patent No.: US 9,952,922 B2
(45) Date of Patent: Apr. 24, 2018

(54) FAULT DETECTION APPARATUS AND METHOD

(71) Applicants: Graham Edmiston, Bridge of Weir (GB); Alan Devine, Paisley (GB); David McMenamin, Glasgow (GB); Andrew Roberston, East Kilbride (GB); James Andrew Collier Scobie, Helensburgh (GB)

(72) Inventors: Graham Edmiston, Bridge of Weir (GB); Alan Devine, Paisley (GB); David McMenamin, Glasgow (GB); Andrew Roberston, East Kilbride (GB); James Andrew Collier Scobie, Helensburgh (GB)

(73) Assignee: NXP USA, Inc., Austin, TX (US)

( * ) Notice: Subject to any disclaimer, the term of this patent is extended or adjusted under 35 U.S.C. 154(b) by 66 days.

(21) Appl. No.: 14/899,595

(22) PCT Filed: Jul. 18, 2013

(86) PCT No.: PCT/IB2013/055921
§ 371 (c)(1),
(2) Date: Dec. 18, 2015

(87) PCT Pub. No.: WO2015/008116
PCT Pub. Date: Jan. 22, 2015

(65) Prior Publication Data
US 2016/0239362 A1    Aug. 18, 2016

(51) Int. Cl.
*G06F 11/00* (2006.01)
*G06F 11/07* (2006.01)
*G06F 11/28* (2006.01)

(52) U.S. Cl.
CPC ........ *G06F 11/079* (2013.01); *G06F 11/0721* (2013.01); *G06F 11/0751* (2013.01); *G06F 11/0757* (2013.01); *G06F 11/0772* (2013.01); *G06F 11/28* (2013.01)

(58) Field of Classification Search
CPC .............. G06F 11/079; G06F 11/0721; G06F 11/0751; G06F 11/0757; G06F 11/0772; G06F 11/28
See application file for complete search history.

(56) References Cited

U.S. PATENT DOCUMENTS 5,699,510 A    12/1997  Petersen et al.
5,796,939 A *  8/1998  Berc ................... G06F 11/3409
                                                      711/216

(Continued)

FOREIGN PATENT DOCUMENTS

CN    1529455 A      9/2004
CN    102841828 a   12/2012
GB    2374954 A     10/2002

OTHER PUBLICATIONS

International Search Report for International application No. PCT/IB2013/055921 dated Apr. 9, 2014.

(Continued)

*Primary Examiner* — Philip Guyton

(57) ABSTRACT

Apparatus suitable for detecting a fault in a processor comprises a monitor which receives input and output signals from the processor and generates a hash index key which is used to access entries in a hash table. The entries may include actions such as setting a timer so that the response of an output to a change of state of an input may be confirmed as valid within a specified time interval.

12 Claims, 6 Drawing Sheets

(56) References Cited

U.S. PATENT DOCUMENTS

| | | | |
|---|---|---|---|
| 6,084,877 A | | 7/2000 | Egbert et al. |
| 6,134,655 A | * | 10/2000 | Davis ................. G06F 11/1441 |
| | | | 713/1 |
| 6,212,134 B1 | | 4/2001 | Yamashita |
| 6,678,837 B1 | * | 1/2004 | Quach ................. G06F 11/1004 |
| | | | 712/244 |
| 6,813,713 B2 | | 11/2004 | Akiyama |
| 7,225,381 B1 | * | 5/2007 | Lehman ............. G06F 11/1016 |
| | | | 714/746 |
| 7,359,819 B2 | | 4/2008 | Aiwazian et al. |
| 2005/0078427 A1 | | 4/2005 | Castro |
| 2006/0093144 A1 | | 5/2006 | Reinelt |
| 2007/0088974 A1 | * | 4/2007 | Chandwani ......... G06F 11/0781 |
| | | | 714/6.11 |
| 2007/0277070 A1 | | 11/2007 | Janke et al. |
| 2008/0189075 A1 | * | 8/2008 | Rodriquez ............. G06F 11/30 |
| | | | 702/183 |
| 2012/0072786 A1 | | 3/2012 | Bahali et al. |
| 2012/0239686 A1 | | 9/2012 | Moskowitz et al. |
| 2012/0290882 A1 | | 11/2012 | Corkum |
| 2013/0024724 A1 | | 1/2013 | Fukuda |
| 2014/0115401 A1 | * | 4/2014 | Ito ...................... G06F 11/1641 |
| | | | 714/37 |

OTHER PUBLICATIONS

European Search Report dated Feb. 2, 2017 for corresponding EP Application No. 13889637, 8 pages.

* cited by examiner

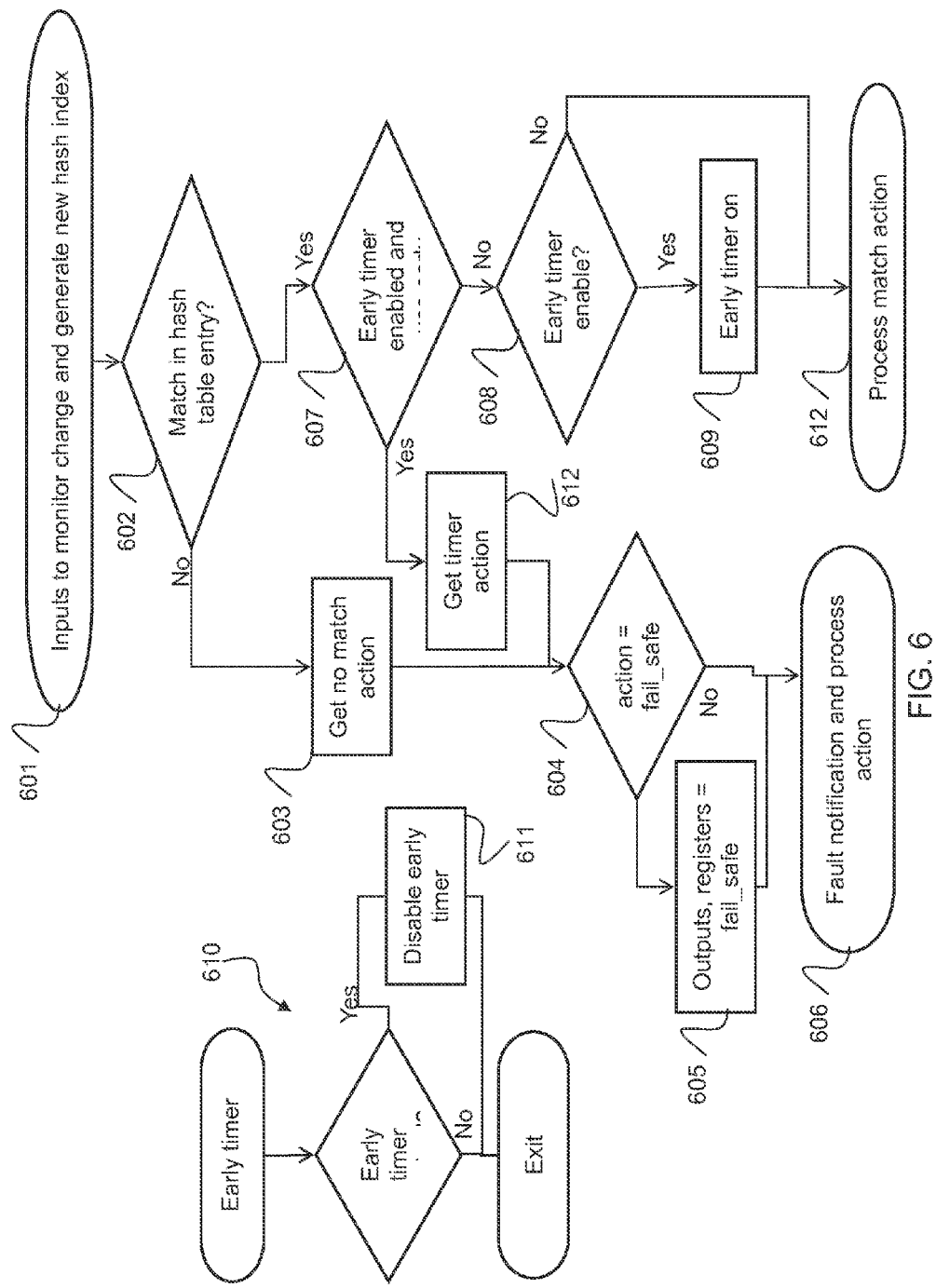

FAULT DETECTION APPARATUS AND METHOD

FIELD OF THE INVENTION

This invention relates to a method and apparatus for fault detection and has particular, though not exclusive, applicability to fault detection in a microcontroller, central processing unit (CPU) or the like.

BACKGROUND OF THE INVENTION

The propagation of errors and faults from a controller to the wider external system that it controls can occur if the primary control system fails. This can result in one or more parts of the external system either generating an illegal response or failing to respond at all. A fault in a primary controller can be caused, typically, by corrupted software, a hardware fault or by operation out of specification. Faults may be propagated externally to the primary controller via those of its output pins which have been configured to an incorrect value. Correct values are required in an appropriate timeframe for the intended operation of the external system. U.S. Pat. No. 7,359,819 discloses a method of testing a driver output by comparing hash values taken from normalised output data with baseline output data and detecting variations between the two. A conventional hash algorithm is used for computing the hash values.

SUMMARY OF THE INVENTION

The present invention provides a fault detection apparatus and method as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 6 is a simplified flowchart of an example of a third method for detecting faults.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
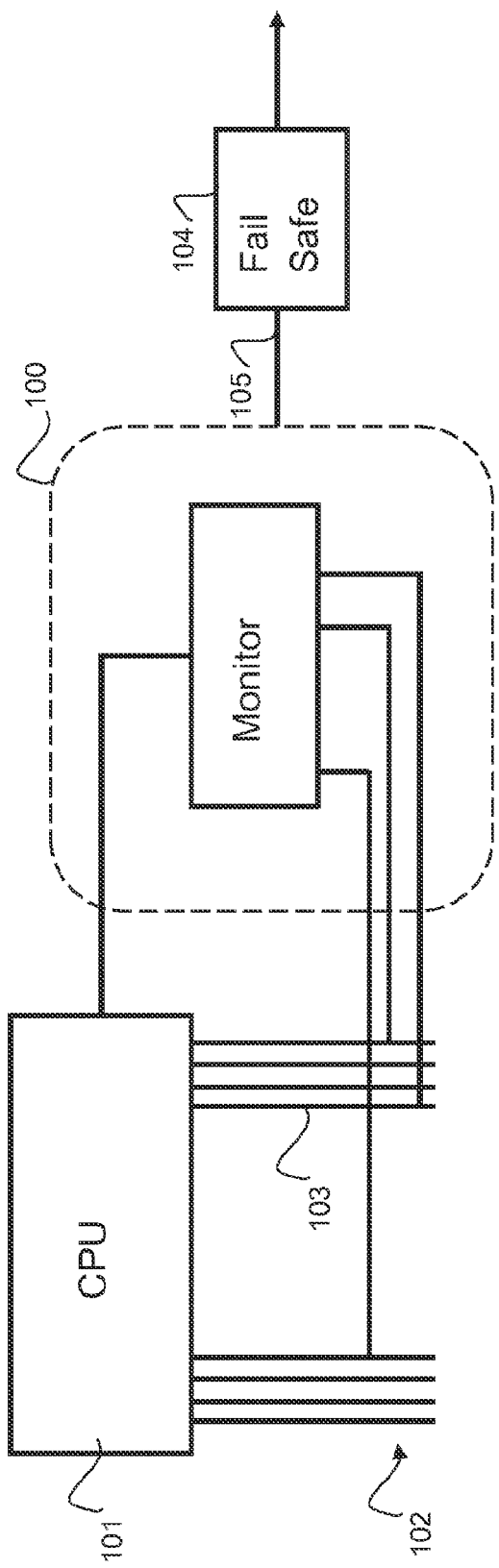
FIG. 1 schematically shows an example of an embodiment of a fault detection apparatus arranged for monitoring the inputs and outputs of a central processing unit.

Referring now to FIG. 1, a fault detection apparatus comprising a monitor 100 may be operably coupled to a CPU 101 which is to be monitored for faults. The CPU 101 may comprise part of a control system and may be operably coupled to a plurality of peripheral components (not shown) via a plurality of input lines 102 and output lines 103. One or more of the input lines 102 and output lines 103 may be operably coupled to the monitor 100 for checking of valid input state changes and reactions thereto by the CPU 101 and within a specified time period, interval or limit. A "fail safe" module 104 may be operably coupled to the monitor 100 and may be arranged to, on detection of a fault by the monitor 100, take action to prevent faults propagating further or put the CPU 101 into a failsafe mode of operation. For example, the monitor 100 may generate a fault condition notification on an output interface 105 and the failsafe module 104 may respond by setting output pins of the CPU 101 to a safe state. In one embodiment, the functionality of the fail safe module may be included in the monitor 100.

In an alternative arrangement, the monitor 100 may not necessarily be operably coupled to a CPU. For example, the CPU 101 may implement a subset of the functionality supported by an integrated device that may be operably coupled to the monitor 100 instead. For example, such an integrated device may support several I/O (input/output) interfaces of different types e.g. an ADC (analog to digital converter), DAC (digital to analog converter), a UART and an Ethernet port. In examples such as these, the monitor 100 may be arranged to monitor one or more ports. The monitor 100 may then be operably coupled to those pins and registers of the ports that need monitoring, so in this case the monitor will be decoupled from CPU monitoring. Hence a CPU may be monitored in some cases but in other cases may be informed of error conditions in the portion of a system or integrated device being monitored via an interrupt or other such signal which may be generated by the monitor 100. In other cases there may be an autonomous modular block in the system that needs to be monitored and the CPU may only be informed of an error condition via an interrupt.

Figure 2:
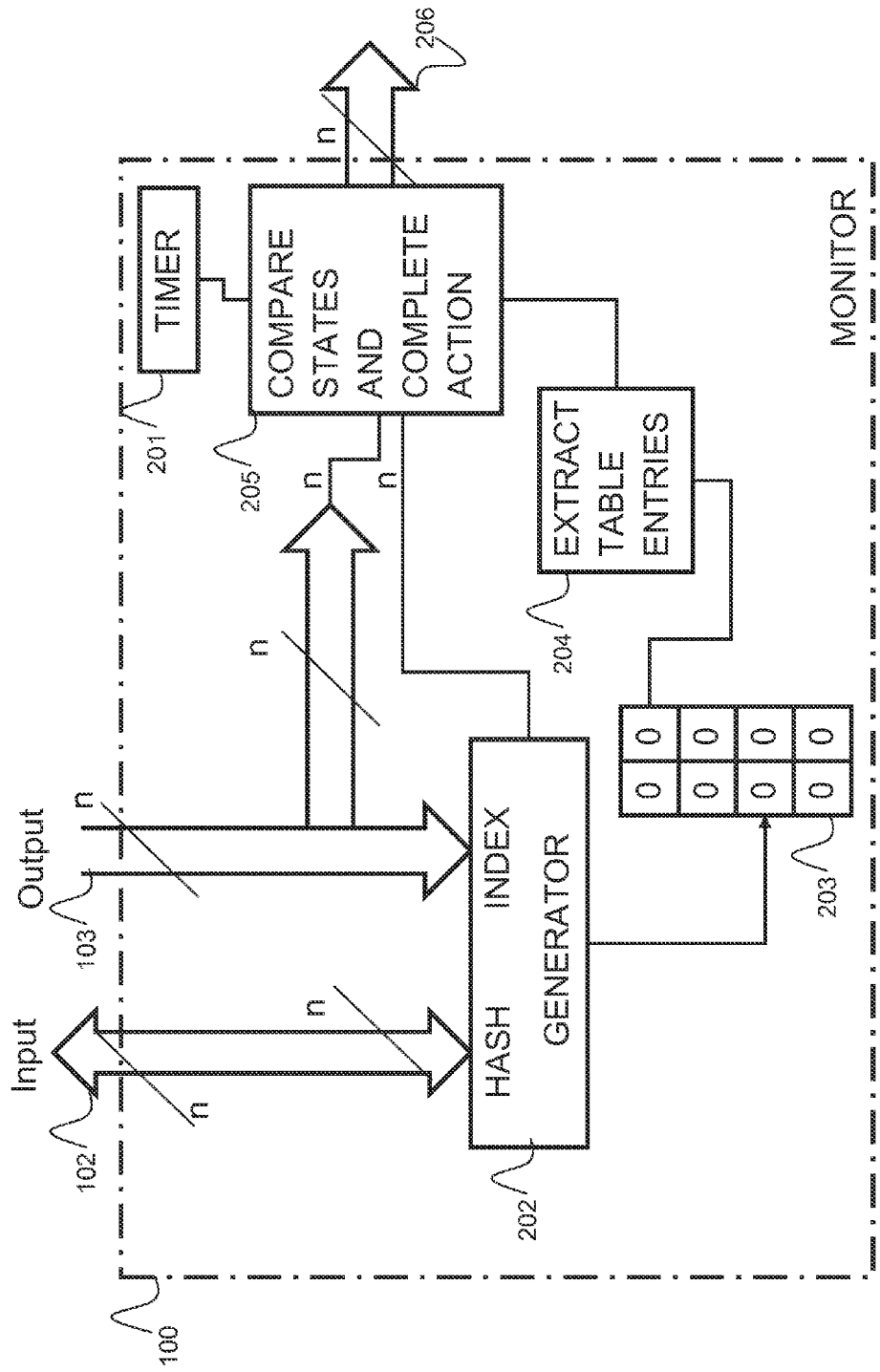
FIG. 2 is a simplified block diagram of an embodiment of a fault detection apparatus.

Referring now to FIG. 2, which is a simplified schematic block diagram of the monitor 100 of FIG. 1 and shown in more detail; the monitor 100 may include a timer 201. Such a timer 201 may be employed for enabling monitoring of reaction times of a change of state of an output of the CPU 101 in response to a change of state of a particular input of the CPU within an allowed time period.

The monitor 100 may also include a "hash index key generator" module 202 which may perform a hashing function on any selected one or ones of the CPU inputs 102 or outputs 103. Outputs of the hash index key generator module 202 (whose operation will be described in greater detail below) may be operably coupled to a hash table 203.

The hash table 203 may be programmable in order to allow input and output states of the CPU 101 to be verified dynamically as valid or invalid.

An "extract table entries" module 204 may be operably coupled to the hash table 203 and arranged to extract certain entries (or "bins") of the hash table which are associated with a hash index key (provided by the hash index key generator module 202) and to feed them to a "compare states and complete action" module 205.

The "compare states and complete action" module 205 may be arranged to compare output states of the CPU 101 with predefined states extracted from the hash table 203 and may also be operably coupled to the timer 201 and further arranged to complete certain actions associated with an extracted table entry and to generate a fault notification signal on an output interface 206 under certain circumstances to be described below.

The monitor 100 of FIG. 2 may provide an autonomous hardware input/output reaction system that monitors selectable internal and external CPU input transitions and then ensures that a valid reaction occurs in response to input state changes within a configured timeframe. In one embodiment, the validity of a reaction is checked against an entry in the hash table 203. The hash table 203 may provide a scalable and efficient method of checking the validity of the inputs and the reaction in response to the inputs for real-time applications. If an expected valid change of an output is detected not to occur within a specified time limit or the output changes to an invalid state, the monitor 100 may detect this and generate a fault notification signal on the output interface 206. Examples of CPU inputs may be signals on external pins, internal signals or register configurations. Examples of outputs and reactions may be state changes, interfaces or registers or signals on external pins.

The signals to be monitored by the monitor 100 and which may also be fed into the hash index key generator module 202 may comprise but not limited to, for example, register states, configuration registers, input/output signals, bus control signals, internal signals for hardware, transmit data, receive data, data in memory, addresses and any combinations of these. In applications where there are registers for controlling a state machine, then the outputs of these registers as well as the associated input/output signals may comprise the inputs to the monitor 100 and hash index key generator module 202.

Typically, a user or "chip" designer may decide which aggregated, normally decoupled functions are to be monitored; for example, a communications interface such as digital to analog converter or analog to digital converter or serial port and its associated registers, in order to check configuration and state. The selected fields (such as register bits and input/output lines) may be aggregated to form a look-up key. The selected fields may comprise 24 bits of input data to the hash index key generator 202 thus giving 2*24 combinations. This may be too many indexes to be monitored in hardware using a direct index look-up table. A look-up key may be hashed to 10 bits, say, as a typical example such that a 1024 entry look-up hash table (which is more easily realisable in hardware) may be used. Such a hashing function may be performed in the hash index key generator module 202. A hash index key may be generated using an appropriate conventional algorithm. For example, a CRC 32 hash function may be used or a security-based hashing algorithm (SHA) may be employed as an alternative. Hash index keys are typically used to access information from a table. For example, U.S. Pat. No. 6,084,877 discloses a method which uses a hashing function to generate an index key for accessing an address in a table.

A hash index generating process in accordance with one embodiment of the present invention may use a programmable number of bits from a hash function as an index into the hash table 203. Each hash index key may then be used as a pointer for accessing index entries (or "bins") in the hash table 203. In one example embodiment, four bins may be present at each hash index. More than 1 bin per hash index may be required in cases where more than one hash index key may point to the same index in the table owing to the hashing process.

In some cases, the CPU may be responsible for changing the states and thereby a hash index key may change as a result of CPU activity. So the CPU may be monitored either directly (through signals from the CPU to the monitor 100) or indirectly, for example through other blocks, registers, I/O lines that the CPU controls.

In an example embodiment, the CPU may be responsible for changing the states and thereby a hash index key may change as a result of CPU activity. The monitor may be responsible for monitoring state and configuration changes made by the CPU 101 and may only allow propagation of the resultant output states to the system's outputs 103 if the hash index key yields an appropriate match.

The CPU may be monitored either directly (through signals from the CPU to the monitor 100) or indirectly, for example through other blocks, registers, I/O lines that the CPU controls. The CPU may also not be monitored when the monitor is operably coupled to an autonomous element in the system that is controlling the function, inputs or outputs to be monitored.

Figure 3:
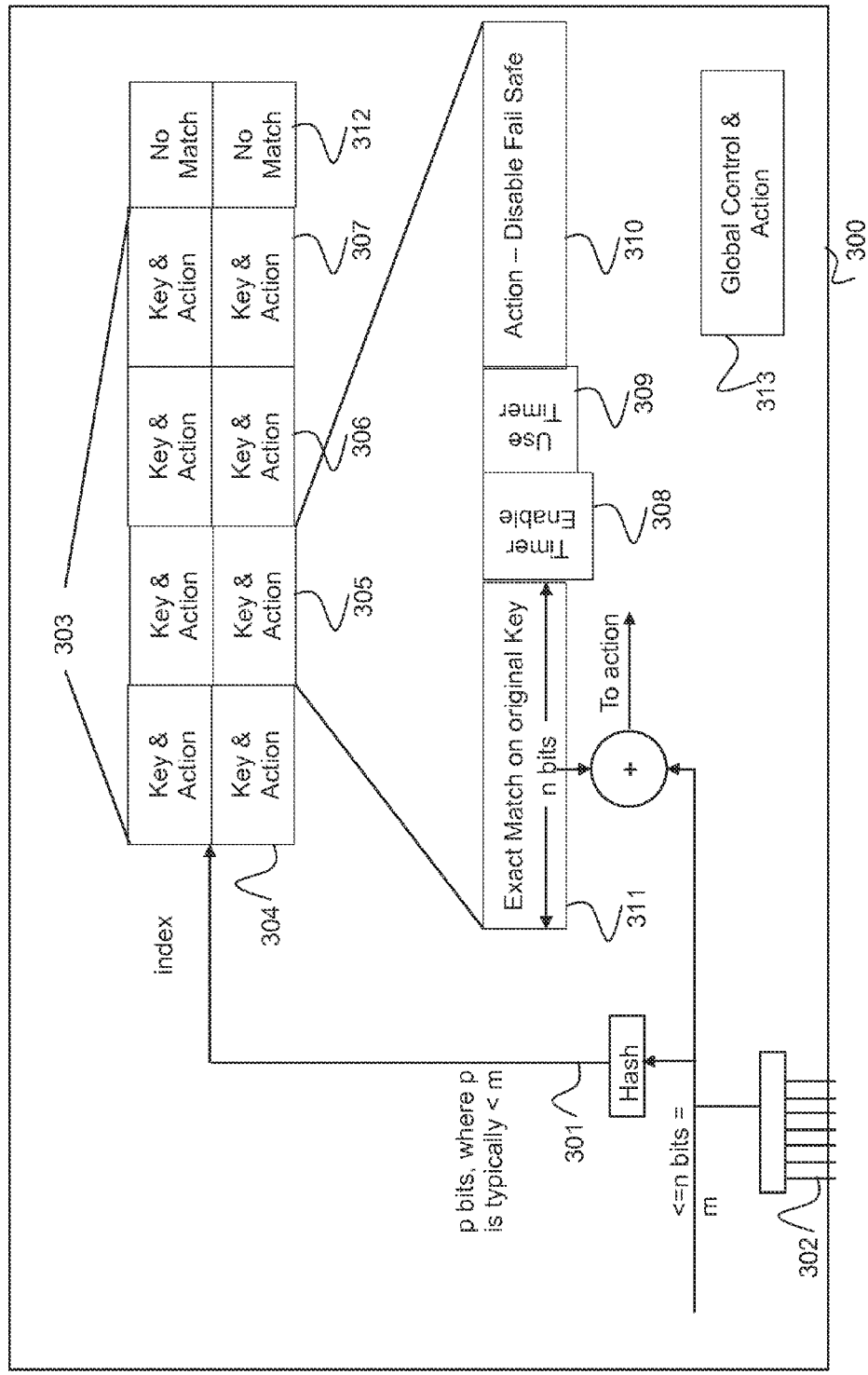
FIG. 3 is a schematic diagram illustrating functionality of a hash table.

FIG. 3 illustrates schematically an example of a hash table 300 and its functionality. Hashed results 301 of inputs 302 to the monitor from a CPU and/or I/O pins and registers, and comprising hash index keys may be used as indexes to look up table entries i.e. to look for an entry in the table that matches the particular input values to the monitor that yielded the index. An input value to the monitor may thus be thought of as an "origin key." In this example, an index 303 in the hash table may comprise four bins 304-307. In one example, each bin may comprise values of inputs to the monitor ("origin key") and an associated action. The same index value (a hash collision) is possible for differing input values to the monitor. Hence more than one bin may be required for each index. By this means, separate actions for each set of input values that yields the same index may be provided.

Examples of associated actions are enabling 308 a timer, for example when a certain state is reached. Another example of an action may be to use 309 a timer when a particular state is reached in order to validate that a transition was completed in time or that it did not occur to quickly. In one example, the table may comprise an entry for enabling and disabling a timer. So, for example, the timer may be enabled when the generated hash index key locates a bin that matches an entry with a timer enable bit set.

A further example of an action may be to disable 310 the outputs or configure failsafe values on the outputs or ignore an interrupt exception request.

For an exact match on a table entry with a hash index key a comparison may be made against an origin key. So, if an entry in the hash table is found 311 that exactly matches an input value of an input value 302 (origin key) to the monitor (prior to the hashing process), then the associated action 308, 309, 310 may be performed.

In one example of operation, the CPU may process the actions. In another example, the monitor may be arranged to process the actions. The monitor may also be arranged to inform the CPU of events via an interrupt.

The monitor may also be arranged to detect that a certain state has been reached (that is for example, certain inputs 302 reaching particular values) by way of the changing hash index keys generated in the hashing process from the changing inputs 302 to the monitor. This process can be very dynamic as the hash index keys can be constantly changing and therefore relaying from table entry to table entry.

In a further example, the action could be putting the outputs of the CPU or pins being monitored and/or system, for example, into a failsafe mode, for example if a serious error condition has been reached regarding the combination of pins and registers being monitored. The entry in the appropriate bin in the hash table may indicate the severity of the error.

Alternatively, the action may be to do nothing if the matching entry in the hash table relates to an expected state.

If there is no match for the generated hash index key to be found in the table, then "no match" actions may be carried out. In one embodiment, each index 303 in the hash table may comprise a "no match action" 312. In this example then there may be four entries that are compared against input values (original key) and a no match action. In some cases the "no match action" may be one global entry for the monitor. An advantage of having a "no match action" per index makes the monitor more flexible and extensible.

A global control and action entry 313 may also be provided which may include actions to be carried out depending on the expiry, or otherwise, of a timer which may have been enabled.

Example embodiments of a fault detection apparatus may utilise dynamic hashing of inputs and outputs coupled with a timer in order to provide a safe and deterministic input/output monitor without adding to CPU overhead. A hash table coupled with a timer may be used to validate if a state change occurs within a specified time period. An illegal hash index may be used to trigger deterministic behaviour controlled by programming the monitor.

The fault detection apparatus of the example embodiments may thus provide an early deterministic determination of failures and may, for example, be used for applications that use a microprocessor microcontroller unit, a microprocessor unit or ASIC to control input/output communications ports or other such interfaces.

Early detection of failures, advantageously, may enable a control system to enter a pre-determined or fail safe state in order to prevent harm to peripheral devices and to prevent further propagation of errors in the external system.

The fault detection apparatus of the example embodiments may also provide a solution to address safe input/output management within an ISO 26262 safety system and with a reduced software requirement, thereby making safety certification easier. Further, the fault detection apparatus 100 may permit input/output containment during any system failure.

Examples of the fault detection apparatus 100 may be included in the same package as the CPU 101 or may comprise a discrete device or module.

Figure 4:
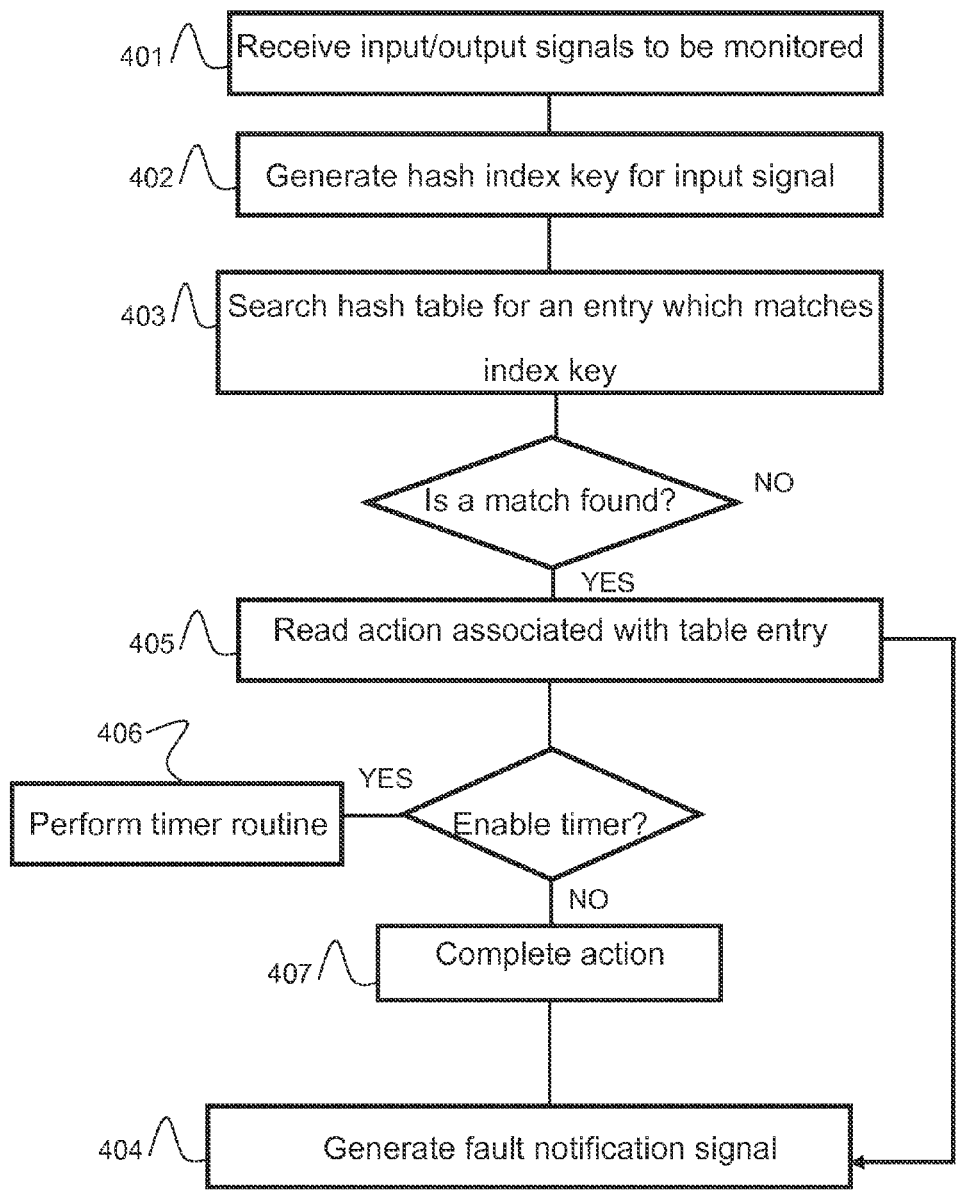
FIG. 4 is a simplified flowchart of an example of a first method for detecting faults in a device such as a central processing unit.

An example method for detecting faults in a device such as a CPU will now be described with reference to FIG. 4 which is a simplified flowchart 400.

At 401, one or more signals which are to be monitored may be received by a fault monitor.

At 402 a hash index key may be generated for an aggregation of received signals At 403 a hash table may be searched for a matching entry to the value of the received signal. If a match is not found then a fault notification signal may be generated at 404. This signal may be used to put the CPU into a failsafe mode of operation, by setting its output pins at a safe state example.

If on the other hand a matching entry is found, then at 406 an action associated with the found entry is read. Optionally, the entry may include an instruction to enable one or more timers. If so, then the method may proceed (at 406) by performing subsequent steps to be described below with reference to FIGS. 5 and 6. Otherwise, the associated action may be completed at 407.

In one embodiment, a method of detecting a fault may comprise checking for valid state changes or responses within a specified time interval. For example, this functionality may be provided by the timer module 201 (see FIG. 2) In one example, the timer module may comprise a first timer (a "late" timer, say) which may be used to confirm that a particular expected response or state change occurred before expiry of a specified time period. The timer module may comprise a second timer (an "early" timer, say) which may be used to confirm that a response or change to a new state did not occur too quickly but occurred after expiry of a specified time limit. In another embodiment, the timer module may comprise a late timer and an early timer and the actions of the late timer and the early timer may be combined, that is to say that these two timers may be used concurrently such that a window is established in which an expected event, response or state change, for example, should occur.

Figure 5:
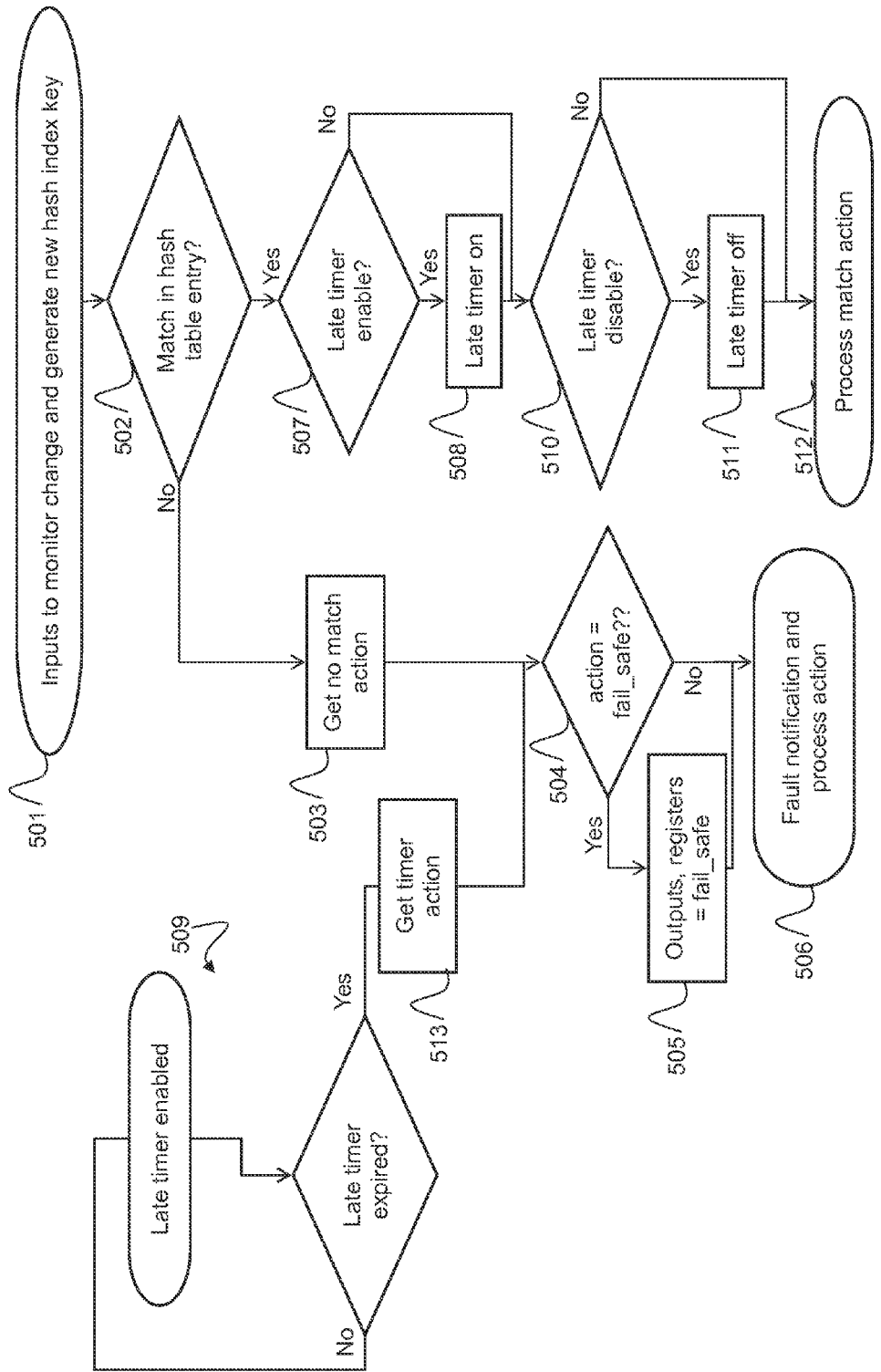
FIG. 5 is a simplified flowchart of an example of a second method for detecting faults.

Referring now to FIG. 5, at 501, the inputs to the monitor may change, resulting in a new origin key and a new corresponding hash index key being generated.

The hash table may be searched at 502 for a matching origin key entry at the new hash index.

If no match is found, then at 503 a "no match" action may be extracted from the hash table. The "no match" action may be read at 504 and may comprise, for example, setting outputs and registers of the device being monitored into a failsafe mode (at 505) or, alternatively, at 506 generating a fault notification signal and processing any other action included in the "no match" action entry in the hash table.

If it is determined at 502 that a matching entry is found, then it may be further determined at 507 whether or not the found entry contains an action that switches on a late timer. If so, then at 508 the late timer is switched on and (at 509) runs autonomously, checking for a timeout on each increment. It may be further determined at 510 whether or not the matching entry switches off the late timer and at 512 any other actions associated with the found entry may be processed.

The inputs to the monitor may change again resulting in a match on the expected event after the late timer was enabled. In such a case, the found entry may then contain an action to disable the timer (510). If so, then at 511, the timer may be switched off and at 512 any other actions associated with the found entry may be processed. One example of an action may be to do nothing further as the matching values relate to an expected state which may have been reached before the late timer had expired. Correspondingly, the late timer will not timeout.

If the hash index key changes one or more times, due to new values of the inputs to the monitor, but does not match on any entry that switches off the late timer, then the late timer may expire. In this case, one or more timer actions may be extracted at 513 and may be processed accordingly at 505 and 506. Such timer actions may comprise setting outputs and registers of the device being monitored into a failsafe mode or generating a fault notification signal, or generating an interrupt, for example.

If the hash index key does not change after enabling the late timer, the late timer may expire. The timer actions may then be read (513) and processed accordingly at 505 and 506. Such timer actions may comprise setting outputs and registers of the device being monitored into a failsafe mode or generating a fault notification signal, or generating an interrupt, for example.

Referring now to FIG. 6, at 601, the inputs to the monitor may change, resulting in a new origin key and a new corresponding hash index key being generated.

The hash table may be searched (602) for a matching origin key entry at the new hash index. If no match is found, then at 603 a "no match" action may be extracted from the hash table. The "no match" action may be read at 604 and may comprise, for example, setting outputs and registers of the device being monitored into a failsafe mode (at 605) or, alternatively, at 606 generating a fault notification signal and processing any other action included in the "no match" action entry in the hash table.

If, at 602, a matching entry is found, then at 607 it may be determined whether or not the found entry contains an action for using an enabled early timer and at 608, whether the found entry contains an action for enabling an early timer.

If it is determined (at 608), that the found entry contains an action to enable the early timer, then at 609 the early timer may be switched on. The early timer may then run autonomously (610) checking for a timeout on each increment. If it encounters a timeout, the early timer will be switched off at 611. Any other action associated with the found entry may be processed at 612.

In cases where a matching entry is found and the early timer is not in use, a matching entry action (612) may need to do nothing further as the matching values may relate to an expected state having been reached after the early timer had expired.

If the origin key yields a subsequent hash index key which matches an entry with an action for using the early timer and the early timer is enabled (607) then a timer action may be extracted at 612. The timer action may comprise setting outputs and registers of the device being monitored into a failsafe mode (at 605) or generating a fault notification signal (at 606), for example.

In another embodiment, the origin key may yield a hash index key which matches an entry in the hash table that enables both the late timer and the early timer. In this case, the process flows described with reference to FIGS. 5 and 6 may run concurrently thereby generating a window of time within which the expected new origin key must occur.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

As an example, a tangible computer program product may be provided having executable code stored therein to perform a method for detecting a fault in accordance with the appended claims.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium.

All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Further, the entire functionality of the monitor shown in FIG. 2 may be implemented in an integrated circuit. That is to say that fault detection apparatus may be implemented in an integrated circuit. Such an integrated circuit may be a package containing one or more dies. Alternatively, the examples may be implemented as any number of separate integrated circuits or separate devices interconnected with each other in a suitable manner. For example, an integrated circuit device may comprise one or more dies in a single package with electronic components provided on the dies that form the modules and which are connectable to other components outside the package through suitable connections such as pins of the package and bondwires between the pins and the dies.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A method for detecting a fault in a device, the method comprising;
   receiving from the device, a first signal to be monitored, said first signal to be monitored having a value;
   generating a first hash index key for the first signal to be monitored;
   searching, using said generated first hash index key, a hash table for an entry matching the value of the received first signal;
   if a matching entry is not found, completing a first action; and
   if a matching entry is found, completing a second action associated with the found matching entry, wherein the second action comprises:
      enabling a first timer and a second timer, wherein a time interval of the second timer is longer than a time interval of the first timer;
      receiving a second signal to be monitored;
      said second signal having a value;
      generating a second hash index key for said second signal;
      searching, using the generated second hash index key, the hash table for an entry matching the value of the received second signal,
      generating a fault notification signal in response to an entry matching the value of the received second signal being found before the first timer expires; and
      generating the fault notification signal in response to the second timer expiring before an entry matching the value of the received second signal is found.

2. The method of claim 1, wherein said first action comprises generating the fault notification signal.

3. The method of claim 1 wherein said first action comprises putting the device into a failsafe mode of operation.

4. The method of claim 1 wherein the timer sets one or more predetermined time intervals and if no matching entry is found within a time interval set by the timer, completing a third action.

5. The method of claim 4 wherein the third action comprises generating a fault notification signal.

6. The method of claim 4 wherein the third action comprises putting the device into a failsafe mode of operation.

7. The method of claim 4 wherein the third action comprises generating an interrupt.

8. Fault detection apparatus to detect a fault in a device, said apparatus comprising:
   a memory to store a hash table, and
   a monitor circuit arranged to receive from the device, a signal to be monitored, said signal to be monitored having a value, to generate a first hash index key for the signal to be monitored, to search, via said generated first hash index key, the hash table for an entry matching the value of the received signal, and if a matching entry is not found, to complete a first action and if a matching entry is found, to complete a second action associated with the found matching entry, wherein the second action comprises: the monitor circuit to enable a first timer and a second timer, wherein a time interval of the second timer is longer than a time interval of the first timer, to receive a second signal to be monitored, said second signal having a value, to generate a second hash index key for said second signal, to search, using the generated second hash index key, the hash table for an entry matching the value of the received second signal, to generate a fault notification signal in response to an entry matching the value of the received second signal being found before the first timer expiring before, and to generate the fault notification signal in response to the second timer expiring before an entry matching the value of the received second signal is found.

9. The fault detection apparatus of claim 8 comprising the first and second timer arranged to set one or more predetermined time intervals during which the hash table is searched for a matching entry.

10. The fault detection apparatus of claim 8 wherein the fault detection apparatus is implemented in one or more integrated circuit devices.

11. A non-transitory tangible computer program product having executable program code stored thereon for execution by a processor to perform a method in accordance with claim 1.

12. The tangible computer program product of claim 11 wherein the tangible computer program product comprises at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash Memory.

* * * * *